May 12, 1970     M. J. HILLMAN     3,511,151
VELOCITY MEASURING SYSTEM

Filed Oct. 31, 1966     2 Sheets-Sheet 1

Murray J. Hillman,
INVENTOR.
BY.

GOLOVE & KLEINBERG,
ATTORNEYS.

Murray J. Hillman,
INVENTOR.
BY.

GOLOVE & KLEINBERG,
ATTORNEYS

United States Patent Office 3,511,151
Patented May 12, 1970

3,511,151
VELOCITY MEASURING SYSTEM
Murray J. Hillman, West Covina, Calif., assignor to Hycon Mfg. Company, Monrovia, Calif.
Filed Oct. 31, 1966, Ser. No. 596,038
Int. Cl. G03b 29/00
U.S. Cl. 95—12.5    10 Claims

ABSTRACT OF THE DISCLOSURE

A method and apparatus for measuring the actual velocity of a movable member and the error between actual velocity and desired velocity of the member, in which the image motion compensation system of a camera is tested. A film has a magnetizable strip applied thereto and a clock track is accurately recorded in the strip. The film is loaded in the camera and a pick up head reads the clock track as the film is moved. The actual frequency read can be converted into velocity and after calibration, compared with standard signals to enable a measure of error in velocity.

---

This invention relates to velocity measurement devices, and more particularly to a method for accurately measuring the linear speed of a moving member having a longitudinal dimension and the angular speed of a rotating member, and to apparatus for practicing said method.

Apparatus according to the present invention is useful for measuring velocities wherever it is practical to generate a velocity representing signal the frequency of which is proportional to velocity. However, this invention finds particular application with respect to image motion compensation systems of aerial cameras, and will be described with particular reference to such systems.

In aerial photography, conditions exist which result in relative movement between the camera and the object which is to be photographed. For example, when photographing the earth's surface from a camera attached to a moving airplane, the image at the focal plane of the camera is continually changed due to the relative movement of the camera and the earth's surface. In order that the photograph of the image will not be blurred because of such relative movement, provision must be made to compensate for image motion during the exposure interval of the film.

Various image motion compensation devices have been employed in combination with aerial cameras, to eliminate movement of the image upon the film during an exposure interval. For example, the film format may be translated during the exposure interval with a velocity equal to the velocity of the image over the focal plane. This may be accomplished by either moving the film over the camera platen during this time, or by moving the camera platen upon which the film format has been temporarily adhered.

Alternatively, the entire camera may be rotated during the exposure interval to provide image motion compensation. Still other image motion compensation arrangements cause rotation of a mirror, located in the optical path between the camera lens and the object, thereby maintaining the image stationary in the focal plane.

In the "moving film" and the "moving platen" types of compensation systems, the film format must be caused to move in the direction of image travel, during the exposure intervals, at a speed which is a predetermined function of the velocity and altitude of the vehicle. Similarly, in the "moving camera" and "moving mirror" types of image compensation systems, the camera or the mirror, respectively, must rotate with an angular velocity which is a function of the same parameters, during the exposure intervals. For any particular conditions of vehicle velocity and altitude, therefore, the linear velocity of the film format or the angular velocity of the rotational members, for obtaining a maximum of image motion compensation, may be accurately determined.

The image motion compensation mechanisms may be pre-set prior to a reconnaissance mission flown at a particular velocity and altitude; alternatively, the camera may be equipped with a mechanism for controlling the image motion compensation system during flight conditions in accordance with velocity and altitude information.

In either case, it is apparent that the amount of image motion compensation actually experienced is dependent upon the degree to which the image motion compensation system is calibrated and/or standardized. In a moving film system, for example, a maximum amount of image motion compensation will be obtained when the film travels during the exposure interval in response to a velocity command signal at a velocity which exactly corresponds to the desired film velocity represented by said command signal.

The final tests in determining the degree of calibration of such systems involve the impressing of a known velocity command signal into the system, measuring the actual velocity of the film during the exposure interval, and comparing the actual velocity to the expected velocity of the film.

In the past, it has been a general practice to expose a quantity of film under controlled conditions in order to measure actual film velocity during the exposure interval. An aerial camera having a focal plane shutter is operated with unexposed film, and a stroboscopic light is flashed to expose the film. After the film has been developed, the portions of the film which have been exposed to the stroboscopic impulses through the shutter slit will appear as transverse bands. The distances between adjacent bands are measured. The time interval between exposure of successive bands is a known function of the stroboscope. The average speed of the film in the intervals between stroboscopic impulses can therefore be computed.

Various disadvantages are inherent to the above described method of measuring film speeds. For example, each measurement test requires the exposure and developing of a substantial length of film. Consequently, a significant amount of film is effectively "destroyed." More important, a significant amount of time is wasted, awaiting exposure of the test film. If the results of the test demonstrate that the image motion compensation system requires adjustment, additional tests must be performed to determine the effect of the adjustments. This trial and error technique which requires film development for each test, can be prohibitively expensive in terms of man-hours expended for adjustment and down-time of the camera.

The aforementioned disadvantages are not present in the method for measuring actual film speeds according to the present invention, since a test film is neither exposed nor developed. The image motion compensation system may be adjusted and calibrated during the film velocity measuring process. Furthermore, apparatus according to the present invention may also be employed for determining film transport characteristics other than image motion compensation. In other applications, the angular rates of such rotational members as, for example, moving-camera and moving-mirror image motion compensation systems can also be determined and standardized or calibrated with respect to command signals.

According to a preferred embodiment of the present invention, a method is provided for accurately measuring the linear speed of a moving member having a longitudinal dimension, and for accurately measuring the angular speed of a member rotating about an axis. The invention provides apparatus for practicing the method, and such apparatus may be employed with equal advantage for measuring the velocity of transported webs during any predetermined time intervals, film and camera platen velocities for appropriate image motion compensation systems, and angular velocities of a rotating camera and a rotating mirror for other appropriate image motion compensation systems. According to alternative embodiments, applications of the method of the present invention are possible; for example, the method may be used to determine and adjust the velocity of a focal plane shutter during the critical period of exposure, as well as for determining and calibrating the rotational velocity of a scanning head.

The moving member, or a member which may be substituted for the moving member and which moves with a velocity duplicating that of the substituted member, is processed to impress thereon evenly spaced markers along the direction of prospective travel, the precise distance between adjacent markers being known to a high degree of accuracy. When the member is incorporated in a camera or other device which must operate accurately at predetermined velocities and which is commanded to operate at an expected velocity, the actual velocity of the member may be determined by the frequency response of a velocity transducer which generates an output signal at a frequency proportional to member velocity.

For example, a film strip may be magnetically sensitized along its length, and a signal having a waveform of a precise, known frequency is recorded thereon while the film is moving at a precisely controlled speed. The prerecorded film is placed in a camera, and a magnetic reading head plays back a signal the frequency of which is related to the speed of the moving film. This signal is then converted into a voltage signal, which is then compared with a reference voltage signal which has been previously calibrated to represent a predetermined film velocity.

The error signal thereby produced corresponds to the deviation of the actual velocity of the film from the expected or desired velocity. This error signal may be displayed by suitable recording or indicating devices.

The camera is then adjusted until the error signal is minimized. When the error signal is driven to zero, the actual film speed exactly corresponds to the desired film speed.

Appropriate triggering and gating functions may be incorporated into the system, such that specific time intervals corresponding to different camera operations can be examined. In a preferred embodiment of the invention, the image motion compensation interval of the camera is examined to determine whether the compensation mechanism is operating at its expected speed. A trigger signal is therefore provided near the beginning of the compensation period after acceleration, and a "gate" signal is generated which has a time duration corresponding to the film exposure interval. The timing and width of the trigger and gate signals may be adjusted for testing speeds during any predetermined time interval.

Other types of "recording" and "playback" may be employed with the present invention. For example, an optical grating may be applied to the moving member and the frequency signal may be produced by a photoelectric pulse generator. This technique is preferred when it is desired to determine the actual angular velocity of a rotating device, such as a moving mirror for image motion compensation, or a scanning head. For example, a disc having an optical grating near its edge may be rotated at its center by a shaft extending from the pivot of a moving mirror. As the disc rotates, a photoelectric cell responds to light pulses passing through the optical grating and generates an electrical signal having a frequency corresponding to the rotational velocity of the mirror.

Similarly, an electrodynamic pickup may be employed which generates pulses in response to the passage of ferromagnetic substances such as gear teeth or evenly spaced linear distance markers. Inductive or capacitive transducers are also in combination with appropriate marking indicia, as is well known in the code conversion art.

In a preferred embodiment of the invention, the transducer output wave form is severly limited in order to produce a nearly ideal "square" wave. The square wave train, having a frequency representing the actual speed of the film, is fed into a cross-correlator loop, which produces a voltage output signal which is the analog of film velocity, since the output voltage is directly proportional to the input pulse train frequency.

Within reasonable limits of input pulse train amplitude fluctuation, the velocity analog output voltage is responsive only to the frequency of the input pulse train. The cross-correlator loop includes a cross-correlator which compares the incoming square wave train to the output of a voltage controlled oscillator, for ultimately producing a voltage output signal, the magnitude of which represents the actual speed of the film.

The voltage controlled oscillator is run by a calibrated voltage source which would produce an oscillator output signal having a frequency corresponding to the desired or expected velocity if the pulse train representing actual velocity were removed from consideration. The output of the oscillator is fed into the cross-correlator along with the pulse train, and the cross-correlator takes the average value of the product of the two waveforms.

The output of the cross-correlator is a voltage signal representing this average value, which "trims" the calibrated voltage. The trimmed voltage is fed back to drive the oscillator. In effect, the cross-correlator operates to phase lock the oscillator output signal and the wave train signal in phase quadrature. When the voltage controlled oscillator is "running" at the actual film speed, the oscillator output is a signal having a frequency corresponding to the frequency of the wave train, and the average value of the product of the two waveforms, at quadrature phase lock, goes to zero. The trimmed voltage, therefore, is equal to the velocity analog of the wave train signal frequency and represents the actual speed of the film.

The velocity analog voltage signal is thereupon compared to a reference voltage which is calibrated to represent the expected or desired speed of the film. The resultant error signal represents a deviation of the actual film velocity from the desired film velocity. The scale factor is determined by the value of the reference voltage.

Although ordinary discriminator techniques may be employed to represent the wave-train frequency signal in terms of voltage, and indeed such are included within the scope of the present invention, the cross-correlator techniques described above is of particular significance in the preferred embodiment of apparatus for practicing the method of the present invention. The cross-correlator loop assures that when the two waveforms are frequency and phase locked, extraneous noise is ignored and the correlator output voltage is an accurate analog of the film velocity.

It is an object of the present invention to provide a method for accurately measuring the linear speed of a moving member having a longitudinal dimension, and to provide apparatus for practicing said method.

It is another object of the present invention to provide a method for accurately measuring the angular speed of a member rotating about an axis, and to provide apparatus for practicing said method.

It is a further object of the present invention to provide a method and apparatus for accurately measuring web speeds during predetermined intervals of web transport.

It is yet another object of the present invention to provide a method and apparatus for measuring camera film speeds during predetermined intervals of film transport.

It is a still further object of the present invention to provide a method and apparatus for measuring the film velocity during the exposure interval of a camera, and to compare the actual film velocity during this interval to an expected film velocity which compensates for image motion on the film.

It is another object of the present invention to provide a method and apparatus for accurately testing the performance of image motion compensation systems in a camera without the necessity of exposing and developing a length of test film.

It is yet another object of the present invention to provide a method and apparatus for accurately calibrating the image motion compensatin mechanism of a camera coincident with a performance test.

The novel features which are believed to be charartistic of the invention together with further objects and advantages thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

FIG. 8 is a perspective representation of optical grating-photoelectric transducer apparatus for use with a moving mirror image motion compensation system.

Figure 1:
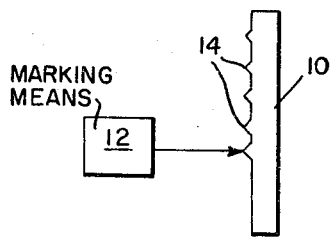
FIG. 1 is a block diagram illustrating a first or "member preparation" step of the method according to the present invention.

Turning first to FIG. 1 there is shown a test member 10, which is a member the velocity of which is to be determined. Alternatively, the test member 10 may be a member which is adapted to be substituted for the actual member, or attached to the actual member, so that the test member 10 will move with a velocity duplicating that of the actual member during the testing step of the present method. During the first or "member preparation" step of the method, marking means 12 interact with the test member 10 to produce thereon evenly spaced index markers 14 the direction of prospective travel during second or the testing step of the test member 10.

The markers 14 are intended to be the source of repetitive impulses when the member is caused to move relative to a transducer. For example, the test member 10 may be a length of magnetically sensitized tape or film, in which case the markers 14 may be evenly spaced magnetic "time pulses" comprising a timing track. Such magnetic markers may be recorded on the test member 10 by the marking means 12, in this embodiment a magnic recording head. The test member 10 is moved past the recording head at a precisely controlled and known velocity and the marking signal is at a predetermined frequency.

Other examples of markers include an optical grating which may later supply impulses to a photoelectric pulse generator. Other examples include ferro-magnetic markers such as "teeth" of a ferro-magnetic substance, whether linearly arranged or circularly arranged such as gear teeth. Other marking systems include the use of alternately conductive and non-conductive segments which in combination with capacitive transducers also can provide signals whose frequency can represent velocity.

After the test member 10 has been processed to impress thereon the evenly spaced markers 14, it may be substituted for the moving member whose velocity is to be determined, or it may be coupled to the moving member in such manner that it moves with a velocity duplicating that of the moving member.

Figure 2:
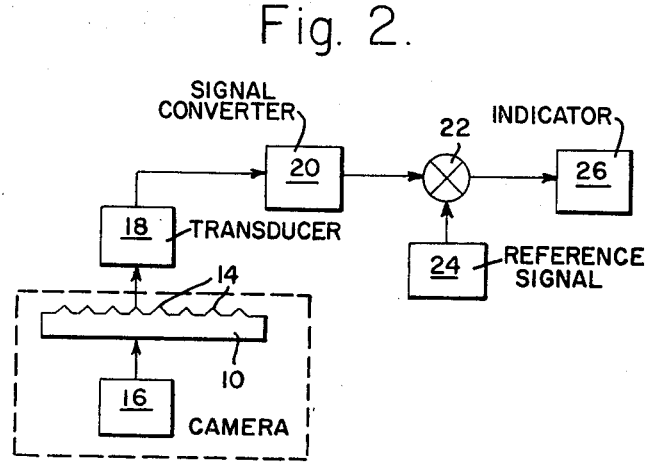
FIG. 2 is a block diagram illustraing a second or "member velocity testing" step of the method according to the present invention.

As shown in FIG. 2, the precision marked test member 10 is driven by a driver 16 at a velocity, the actual magnitude of which is to be determined. When used in combination with a camera, for example, the system driver 16 may be the film transport mechanism, the mechanism which moves the platen (or the platen itself, if the test member 10 is a length of film) during image motion compensation intervals, a rotating pivot shaft of a rotating mirror (when moving mirror image motion compensation systems are to be tested), or a scanning head, in appropriate circumstances.

While the test member 10 is moving in a known direction at the desired speed, the passage of the markers 14 past a point in space activates a transducer 18 to produce an output signal having a waveform whose frequency is proportional to member speed. The frequency information content of the transducer output signal is thereupon converted to a velocity analog electrical signal upon being processed by a signal converter 20.

The velocity analog signal is representative of the actual speed of the test member 10, and it is compared at a comparator 22 with a reference signal 24 which is the analog of the desired speed of the test member 10. The output of the comparator 22 is an error signal E, representing the deviation from the actual speed of the test member 10 from its desired speed, and the presence of this error signal and its magnitude is indicated by the indicator 26.

Alternatively, the actual speed of the test member may be indicated by connecting the signal converter 20 directly to the indicator 26, in which case the indicator 26 may be calibrated in terms of member speed.

By the above method, the system driver 16 may be calibrated in terms of actual speeds produced thereby to correct prior expectations of such speeds. Alternatively, the system driver 16 may be adjusted such that the actual speeds conform to the desired speeds.

Figure 4:
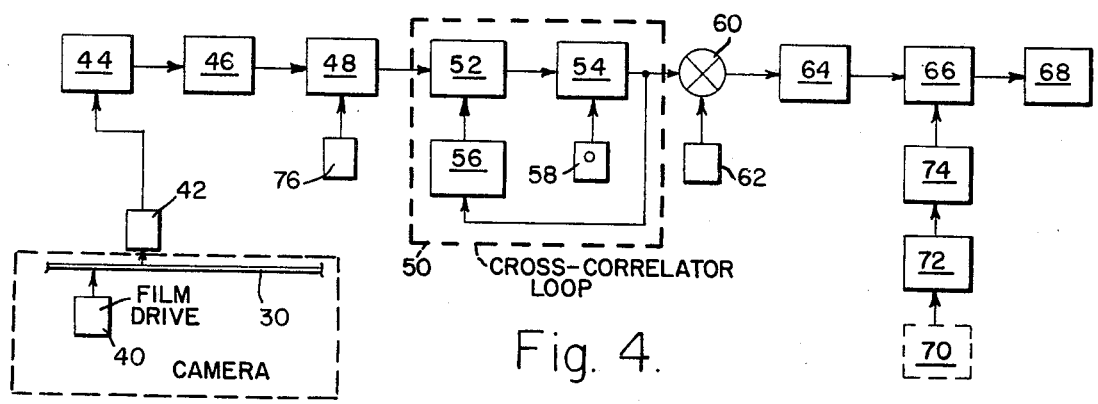
FIG. 4 is a block diagram of a preferred embodiment of apparatus to practice the second step of the method according to the present invention.
Figure 3:
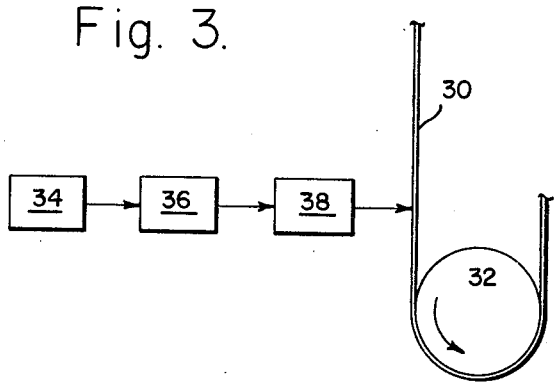
FIG. 3 is a block diagram of a preferred embodiment of apparatus to practice the first step of the method according to the present invention.

A preferred embodiment of apparatus to practice the methods of the present invention is shown in FIGS. 3 and 4. This embodiment finds particular application for determining film speeds in an aerial camera during selected time intervals. More particularly, the preferred embodiment may be successfully and advantageously used to measure film speeds (and platen speeds when the film adheres to the platen) during intervals of image motion compensation.

Apparatus for preparing a length of test film 30 is shown in FIG. 3. The test film 30 may be substantially identical to unexposed camera film, except that the test film 30 includes a magnetizable stripe in the longitudinal direction. For example, the test film 30 may have applied thereon a magnetic iron oxide stripe along its length. The test film 30 is then driven at a precisely controlled and known linear velocity, for example, by driving the film between a pinch roller and a precision rate table 32, which here is used as a capstan.

While the test film 30 is moving at its controlled velocity, a repetitive electrical pulse signal having equal and precisely known time intervals between successive pulses is magnetically recorded upon the sensitized film. For example, the output of a crystal controlled oscillator 34 is applied to a record head driver 36 to drive a record head 38, which, in turn, impresses a known and repetitive magnetic excitation in the iron oxide stripe of the test film 30. The combination of the rate table 32, the record head driver 36 and the record head 38, of course, comprise a precision tape recorder.

For convenience, a 100 kilocycle/per/second crystal oscillator may be employed, as a master clock with a flip-flop chain for frequency division. If a 25 kilocycles per second signal is chosen for recording the test film 30 with the test film moving at a rate of six inches per second, the magnetic stripe of the test film 30 will have impressed thereon a sine wave of magnetic excitation having a wavelength of 240 microinches.

In FIG. 4, there is shown a preferred embodiment for testing the film speed of an operational aerial camera during specific time intervals. A test film 30 has been precisely prerecorded by the apparatus of FIG. 3 and is substituted for unexposed film in the camera. The test film 30 is driven with a desired linear velocity by means of a film driver 40. The film driver 40 may comprise the normal film transport mechanism of the camera, for example, or if it is desired to test the speed of the film for image motion compensation in a camera where a moving platen system is employed, the film driver 40 is the camera platen.

As the prerecorded test film 40 travels at the velocity commanded by the camera system, a signal having a frequency corresponding to the speed of the test film 30 is induced in a signal pickup head 42. The pickup head 42 may be a tape recorder playback head having a magnetic gap substantially narrower than the width of one magnetic cycle as impressed upon the test film 30. For example, if the magnetic cycle on the test film has a width of 240 microinches, a .1 mil head gap would be suitable.

The signal induced in the pickup head 42 is amplified and limited by a limiting preamplifier 44. In the preferred embodiment, the preamplification factor is approximately 30,000. The preamplifier 44 is mounted in close proximity to the pickup head 42 but the remainder of the apparatus of FIG. 4 may be remotely situated from the camera which is being tested.

The preamplifier output is applied to a second limiter and amplifier 46, having a gain of 100. Because fluctuations in signal input to a cross-correlator loop 50 may represent loop gain variations which can adversely affect its operation, it is important that the signal waveform be severely limited. Consequently, the output signal from the second limiter and amplifier 46 is amplified and limited by a third limiter 48 having a gain of 200. The signal output from the third limiter is a nearly ideal square wave having a peak-to-peak amplitude which is standardized at a convenient voltage, for example 3 volts. The standardized, square wave output of the third limiter 48 is thereupon supplied as the signal input to the cross-correlator loop 50 whose output is a D.C. voltage signal having a magnitude which is related to the actual playback speed of the prerecorded test film 30.

The cross-correlator loop 50 includes a cross-correlator 52 having an output which is series connected to a filter amplifier 54. The output of cross-correlator 52 is a D.C. voltage signal which has a magnitude corresponding to and representative of the phase of the applied input signal. The output of the filter amplifier 54 is applied to a voltage controlled oscillator 56, of VCO, the signal output of which is fed to a second input to the cross-correlator 52 for comparison with the output signal from the third limiter 48. A first reference voltage source 58, is calibrated to product an output (after amplification by the filter amplifier 54) which is the exact analog of the desired velocity of the test film 30. The first reference source 58 drives the voltage controlled oscillator 56 to produce an output signal whose frequency identically corresponds to the frequency of the signal produced by the playback head if the film is moved at the desired velocity and is a reference frequency.

In operation the VCO 56 output is fed into the cross-correlator 52, and the output signal from the third limiter 48, representing the actual velocity, is supplied to the cross-correlator 52. The cross-correlator 52 takes the average value of the product of the two waveforms, and delivers an output signal which is at a voltage that represents this average value. The precise voltage derived from the first reference voltage source 58 is "trimmed" by the output signal from the cross-correlator 52 in the filter amplifier 54 and the "trimmed" voltage signal is fed back to drive the voltage controlled oscillator 56.

Figure 5:
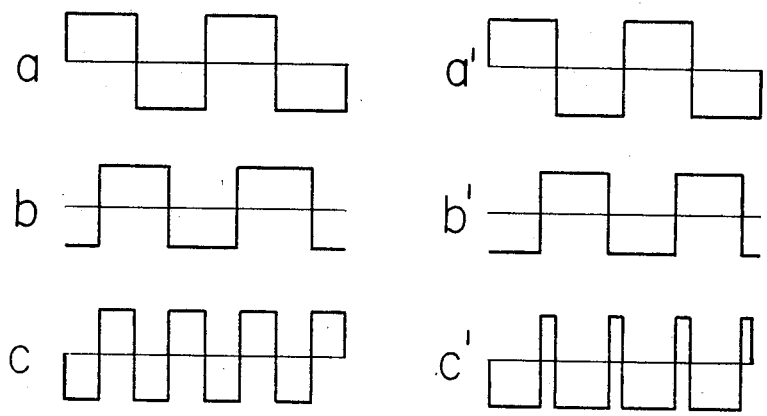
FIG. 5 is a representation of idealized waveforms of signals in the cross-correlator of FIG. 4.

Turning temporarily to FIG. 5, there is shown a series of waveforms which illustrate the operation of the cross-correlator 52 and its interaction with the voltage controlled oscillator 56 of FIG. 4. The cross-correlator 52 includes a phase comparator function which causes the output of the voltage controlled oscillator 52 to be phase-locked in quadrature with the phase of the output of the third limiter 48. This condition is illustrated in FIG. 5(a) and (b) where the signal waveform of FIG. 5(a) represents the output signal of the voltage controlled oscillator 56. The "product" of the two waveforms is shown in FIG. 5(c). It is to be noted that the amplitudes indicated in FIG. 5 are illustrative only and are not drawn to scale.

The waveform of FIG. 5(a') represents again the output signal of the third limiter 48, while the waveform of FIG. 5(b') represents the output signal of the voltage controlled oscillator 56 at a condition with a phase difference other than quadrature or 90°. The waveform of FIG. 5(c') is the product of the waveforms of FIGS. 5(a') and 5(b'). By consideration of FIG. 5(c) and (c'), it can be seen that the average value of the product of the two waveforms, as generated by the cross-correlator 52, goes to zero only when the two input signals have the same frequency and then only when these two waveforms have a phase difference of 90° or are in quadrature. When both these conditions are met, the output signal of the cross correlator 52 goes to zero, and the "trimmed" voltage which now alone drives the voltage controlled oscillator 56 is the analog of the output frequency of the third limiter 48.

When the two signals are not in phase lock, the product voltage represents a "phase error" signal which, when applied to the VCO 56, tends to maintain the phase quadrature of the signals by causing slight modifications in the frequency of the VCO output until phase quadrature is achieved.

Similarly, if the actual film velocity varies from the desired velocity, the cross-correlator 52 will produce an output signal, the magnitude of which, when applied to the VCO 56 changes the frequency until the applied signal is matched both in frequency and phase. The output signal, of course, differs from the first reference signal by an amount and polarity which corresponds to the difference between the actual frequency and the desired frequency.

When the two dominant waveforms which are compared by the cross correlator 48 are phase locked, other signals which may be present, such as extraneous noise, are virtually ignored. Within reasonable limits of amplitude fluctuation of the output signal of the third limiter 48, the output voltage of the cross-correlator loop 50 is responsive only to the frequency of the third limiter 48 output signal. Therefore, the cross-correlator loop output signal, being the "trimmed" voltage described above, represents the actual speed of the test film 30 and is the D.C. voltage of that speed.

The velocity analog, voltage signal is then applied to a comparator 60 where it is compared with a second reference voltage signal 62 which is calibrated to correspond to the output of the cross-correlator loop at different desired speeds of the film. The output signal from the comparator 60 can then represent a deviation of the actual film velocity from the desired film velocity. The scale factor of the output signal is determined by the magnitude of the reference voltage.

The value of the second reference voltage 62 may be arbitrarily chosen; however, the value of the first voltage reference source 58 is determined by the chosen value of the second reference voltage 62. After amplification, the voltage signal derived from the first voltage source 58 must be exactly equal to the second reference voltage 62. In one mechanization of the preferred embodiment of FIG. 4, the reference voltage 62 is selected to be 7 volts. At any desired velocity of the test film 30, the velocity analog voltage will be exactly 7 volts. This requires that the first voltage source 58 be calibrated with respect to the frequency of the signal played back from the test film 30 running at the desired speed.

This is accomplished by a calibrating device 76 which is a source of a signal having the desired frequency. To calibrate the first voltage source 58, the calibration device 76 is connected to the input of third limiter 48 while the test film 30 is idle. The first voltage source 58 is thereupon adjusted until the error signal from the comparator 60 goes to zero. Similarly, other signal frequencies are generated and the reference signal sources are adjusted accordingly. Once calibrated, when the test film 30 is moving, the velocity analog voltage will be exactly 7 volts when the actual speed of the test film 30 is equal to the desired speed, and the error signal from the comparator 60 approaches null. If, however, there is a deviation between the actual and the desired speeds of the test film 30, the error signal from the comparator 60 will be a D.C. voltage. In the preferred embodiment 0.07 volt per percent velocity error is applied to the display device. If a greater amplitude of the error signal is needed, the error signal can be applied to an error amplifier 64. If the error amplifier 64 has a gain of 7.15, the resulting error signal will have a scale factor of 0.5 volt per percent velocity error.

The preferred embodiment is provided with a gate 66 which permits transmission of the error signal to an indicator 68, only during selected time intervals. For example, when it is desired to test the image motion compensation mechanism of a camera, only playback signals resulting from film movement during film exposure intervals are of interest. However, the film motion cycle consists of an "index" phase as well as an image motion compensation phase, so that the indicator 68 must be "programmed" to respond only during the image motion compensation or film exposure portion of the cycle. These intervals are initiated by a trigger source 70 which is connected to an appropriate activator, such as the camera film transport mechanism, the camera shutter, or the moving platen. The trigger source 70 provides a "trip pulse," which is delayed for a period of time corresponding to shutter acceleration into the film format, by means of a gate delay 72. The gate delay output enables a gate width generator 74, to produce a pulse whose duration corresponds to the time required for the shutter to expose the film format during an exposure interval. The gate width pulse enables the gate 66, which may be a field-effect transistor, providing a conductive path between the error amplifier 64 and the indicator means 68 only during the provision of a gate width pulse. It should be noted that the trigger source 70 may be positioned to operate at any point in the film transport cycle, and the gate delay 72 and gate width generator 74 are adjustable, so that the desired interval within the film transport cycle may be examined.

Figure 6:
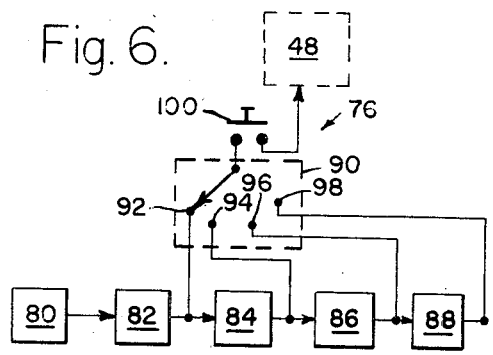
FIG. 6 is a diagram of a preferred embodiment of the calibration apparatus of FIG. 4.

Turning to FIG. 6, there is shown an example of calibration apparatus 76 which may be used in the preferred embodiment of FIG. 4 to provide a calibration input to the third limiter 48. A convenient source of a signal having a precisely known frequency is provided, such as a 100 kilocycle per second crystal oscillator 80, the output of which can be utilized to produce a series of signals of different and precisely known frequencies as with a conventional frequency divider network.

The 100 kilocycle per second output of the crystal oscillator 80 may be applied to trigger a first flip-flop 82, which then provides an output signal at a frequency of 50 kilocycles per second. Similarly, the 50 kilocycle per second signal may be applied to trigger a second flip-flop 84 which provides a 25 kilocycle per second signal, which is serially connected to trigger a third flip-flop 86 to produce a 12.5 kilocycle per second output. A fourth flip-flop ring 88 can provide an output signal having a frequency of 4.167 kilocycles per second if the constituent flip-flops are suitably interconnected.

If the test film 30 (see FIG. 3) has recorded upon it a signal at a frequency of 25 kilcycles per second while moving at a velocity of 6 inches per second, the test film 30 will contain a "magnetic grating" with a 240 microinch repitition interval. Consequently, a playback signal at a frequency of 25 kilocycles per second is produced by the test film 30 moving at a speed of 6 inches per second (see FIG. 4). Similarly, playback signal frequencies of 50 kilocycles per second, 12.5 kilocycles per second, and 4.167 kilocycles per second represent film speeds of 12 inches per second, 3 inches per second, and 1 inch per second, respectively.

Prior to testing the film at one of these desired speeds, the frequency signal corresponding thereto is delivered to the third limiter 48 for calibration purposes as discussed above. This is accomplished by means of a frequency signal selector switch 90 which includes a first contact point 92 connected to the output of the first flip-flop 82, a second contact point 94 connected to the output of the second flip-flop 84, a third contact point 96 connected to the output of the third flip-flop 86, and a fourth contact point 98 connected to the output of the fourth flip-flop ring 88. The selector switch 90 provides a connection from one of these contact points to a push button make 100.

When the push button is depressed the selected frequency signal is applied to the third limiter 48. For example, when the make 100 is closed while the selector switch 90 is closed to the first contact point 92, a signal having a frequency of 50 kilocycles per second will be supplied to the third limiter 48, allowing the first reference voltage source 58 (see FIG. 4) to be calibrated for a desired film speed of 12 inches per second.

Figure 7:
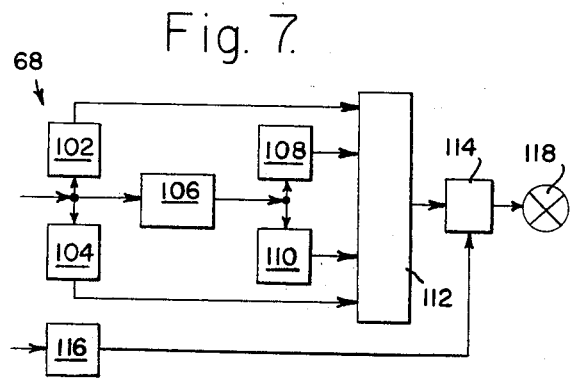
FIG. 7 is a block diagram of one example of indicating apparatus suitable for use with the apparatus of FIG. 4.
Figure 7:
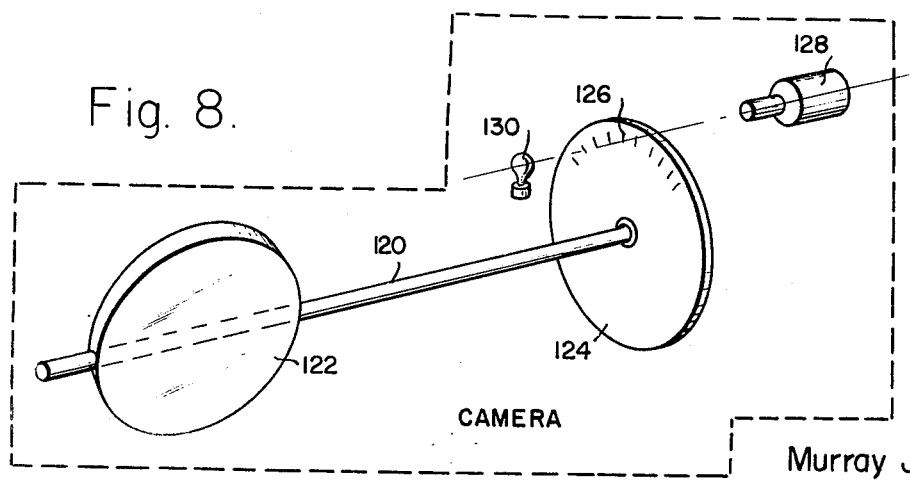

In FIG. 7 there is shown an example of an indicating circuit 68 which may be used on conjunction with the preferred embodiment of FIG. 4. In this example, the output signal from the gate 66 of FIG. 4 is applied to a first voltage discriminator 102 which is pre-set to respond to a first predetermined value of the error signal. The error signal is also applied to a second voltage discriminator 104 which is pre-set to trigger at a second value.

For example, if the error signal is scaled at 0.5 volt per percent error, the first voltage discriminator can be pre-set to trigger at +7.5 volts, while the second voltage discriminator is preset to trigger at −7.5 volts, corresponding to peak velocity errors of +15% and −15%, respectively.

The error signal is also applied to an error filter amplifier 106, which averages the error signal over a period of time having a duration of at least one film exposure interval. This averaged error signal output of the filter amplifier 106 is applied to a third voltage discriminator 108 which is pre-set to trigger at a first or upper limit predetermined value of the averaged error signal. If the averaged error signal is scaled at 0.5 volt per percent error, the third voltage discriminator 108 may be pre-set to trigger at +1 volt, while the fourth voltage discriminator 110 may be pre-set to trigger at −1 volt, respectively corresponding to average velocity errors of +2% and −2%.

The output signals from each of the four voltage discriminators is applied to an "OR" gate 112, the output of which is applied to a logic circuit 114. A second input signal to the logic circuit 114 is provided by the output of a signal strength sensor 116 which is connected to receive the playback signal of the test film 30 of FIG. 4.

For example, the input terminal of the signal strength sensor 116 may be connected to the output terminal of the preamplifier 44 of FIG. 4, and the sensor 116 effectively converts the preamplifier output signal to a D.C. voltage which is proportional to playback signal wngth.

The logic circuit 114 may be designed so that only when the peak and average velocity variations of the test film 30 are within selected limits, and the signal strength voltage exceeds a threshold value, an output signal will be provided from the logic circuit 114 to illuminate a "GO" indicator light 118. Accordingly, it can be seen that if a peak velocity variation from the desired velocity of the test film 30 during the sampling interval exceeds 15%, or if the average velocity variation from the desired velocity exceeds 2%, or if the signal strength voltage is not maintained above the threshold value, the "GO" indicator light 118 will not be illuminated, and a "NO-GO" light (not shown) may be illuminated, for a "fail safe" system.

The "playback" or testing portion of an alternative embodiment of the present invention is illustrated in FIG. 8, for comparing the actual angular velocity of a rotating member with a desired angular velocity. The alternative embodiment finds particular application in testing moving mirror, image motion compensation systems.

A shaft 120 is attached to the rotating pivot of a mirror 122, so that the shaft 120 rotates with the same angular velocity as that of the mirror 122. A transparent disc 124 having an optical "grating" 126 of opaque "timing marks" near its edge is attached at its center to the shaft 120, in a plane orthogonal to the longitudinal axis of the shaft.

As the disc 124 rotates, a photoelectric device 128 converts the light "pulses" passing through the optical grating 126 from a light source 120, into an electrical signal train having a frequency corresponding to the rotational velocity of the mirror 122. The output signal from the photoelectric device 128 may thereupon be processed in accordance in the manner of the preferred embodiment of FIG. 4. The "playback" signal is amplified, limited, and cross-correlated to obtain a velocity analog voltage which is compared to a reference voltage, ultimately producing an error signal which indicates the deviation of the actual angular velocity of the rotating mirror from an expected velocity.

Thus, there has been described examples of a method for accurately measuring the linear speed of a moving member having a longitudinal dimension, and for accurately measuring the angular speed of a member rotating about an axis, together with embodiments of apparatus for practicing the method. The method and embodiments shown have particular significance as applied to the testing of image motion compensation systems in aerial cameras to ensure that the cameras, in operation, accurately compensate for image motion.

Other embodiments of apparatus according to the present invention, modifications of the embodiments herein presented, variations of the method of the present invention, and additional applications of the method may be developed without departing from the essential characteristics thereof. Accordingly, the invention should be limited only by the scope of the claims listed below.

What is claimed as new is:

1. Apparatus for determining the error between actual velocity and desired velocity of a movable member during selected time intervals, comprising the combination of:
   a movable member having impressed thereon along its direction of prospective travel a plurality of evenly spaced markers having a distance between adjacent markers which is precisely known;
   first means for detecting the passage of successive ones of said plurality of markers relative to a read station when a velocity is imparted to the member;
   second means connected to said first means to provide a voltage signal which is the velocity analog of the actual velocity of the moving member;
   third means for comparing said actual velocity analog signal to a first reference voltage signal which is the velocity analog of the desired velocity of the moving member, to obtain an error signal representing the difference between the actual and desired velocities of the moving member;
   fourth means for gating said error signal to correspond to selected time intervals; and
   fifth means for displaying said error signal.

2. The apparatus of claim 1, above, wherein said first means include a transducer operable to provide output signals in response to the passage of said markers, and said second means include:
   limiter means having first and second inputs and an output, said first input being connected to said transducer output, for limiting the amplitude of said transducer output signals to produce a square wave signals having a frequency proportional to member velocity, and
   a cross-correlator loop having an input and an output, said cross-correlator loop input being connected to receive said limiter means output, for producing at said cross-correlator output a D.C. voltage signal having a magniutde corresponding to the frequency of said limiter means output signal.

3. The apparatus of claim 2, above, wherein said cross-correlator loop includes:
   a cross-correlator having a first input connected to said limiter means output, a second input, and an output,
   a filter amplifier having first and second inputs and an output for providing a cross-correlator loop output signal representing the difference between desired and actual velocity,
   a reference voltage source calibrated to provide a second reference voltage signal whose magnitude corresponds to a frequency representing a desired velocity of the member,
   a voltage controlled oscillator having an input and an output, adapted to normally generate a frequency reference signal equal to said transducer output signal when the member moves at the desired velocity,
   said cross-correlator second input being connected to said voltage controlled oscillator output, said cross-correlator output being connected to said filter amplifier first input, said reference voltage source being connected to said filter amplifier second input, and said voltage controlled oscillator input being connected to said filter amplifier output.

4. The apparatus of claim 3, above, wherein said third means comprise:
   a comparator having first and second inputs and an output, said first input connected to said cross-correlator loop output, and said comparator output connected to said fourth means, and
   a voltage source connected to said comparator output, for providing said first reference voltage signal, the magnitude of said first reference voltage signal being identical to said cross-correlator loop output signal when said member is idle.

5. The apparatus of claim 3, above, further including calibrating means coupled to said limiter means for calibrating said reference voltage source to correspond to selected frequencies proportional to different desired velocities of the member.

6. Apparatus as in claim 1, above, wherein the member is a length of film, said markers are magnetized domains, and said first means are magnetically stimulated by the passage of said markers to provide an electrical signal corresponding to the passage of each of said markers.

7. In combination with a camera, apparatus as in claim 1 above, for testing film format velocity during image motion compensation, wherein said movable member is a length of film and further including means coupling said fourth means to the camera, operating circuits, such that said error signal is applied to said fifth means only during camera film exposure intervals.

8. Apparatus as in claim 1, above, wherein the member is a disc, said plurality of markers compromise alternating opaque and transparent sectors, and said first means are optically stimulated by the passage of said markers to provide an electrical signal corresponding to the passage of each of said markers.

9. In combination with a camera employing a mirror to compensate for image motion, apparatus as in claim 8, above, for testing mirror angular velocity, wherein said disc is coupled to the mirror to rotate therewith, further including means coupling said fouth means to the camera operating circuits such that said error signal is applied to said fifth means only during camera film exposure intervals.

10. A method for testing a camera system to determine the actual velocities of a movable member capable of moving at several desired velocities during different modes of operation, said member being an elongated length of film having a magnetizable stripe applied thereto in the longitudinal direction, comprising the steps of: impressing upon the member along its direction of prospective travel a plurality of evenly spaced markers having a distance between adjacent markers which is precisely known by recording on said magnetizable stripe a clock track of predetermined frequency;

detecting the passage of successive ones of said markers relative to a reading station when said member is imparted a velocity having an unknown magnitude and generating a plurality of signals corresponding thereto;

converting said plurality of signals to a voltage signal which is the analog of the actual velocity of the moving member;

sampling said voltage signal only during a selected mode of operation of the camera; and indicating the sampled voltage signal in terms of film velocity only during the selected mode of operation.

References Cited

UNITED STATES PATENTS

| | | |
|---|---|---|
| 2,905,876 | 9/1959 | Hillman. |
| 2,977,422 | 3/1961 | Pear. |
| 2,989,690 | 6/1961 | Cook. |
| 3,019,291 | 1/1962 | Houghton _____ 179—100.2 XR |
| 3,092,687 | 6/1963 | Cannon _____ 95—12.5 XR |
| 3,141,926 | 7/1964 | Newell. |
| 3,238,294 | 3/1966 | Krauss. |
| 3,253,237 | 5/1966 | Runyan _____ 179—100.2 XR |
| 3,355,719 | 11/1967 | Fox. |

NORTON ANSHER, Primary Examiner

L. H. McCORMICK, Jr., Assistant Examiner

U.S. Cl. X.R.

179—100.2; 235—183; 324—70